March 9, 1937. M. WAGNER 2,072,994
MOTOR VEHICLE
Filed March 13, 1935
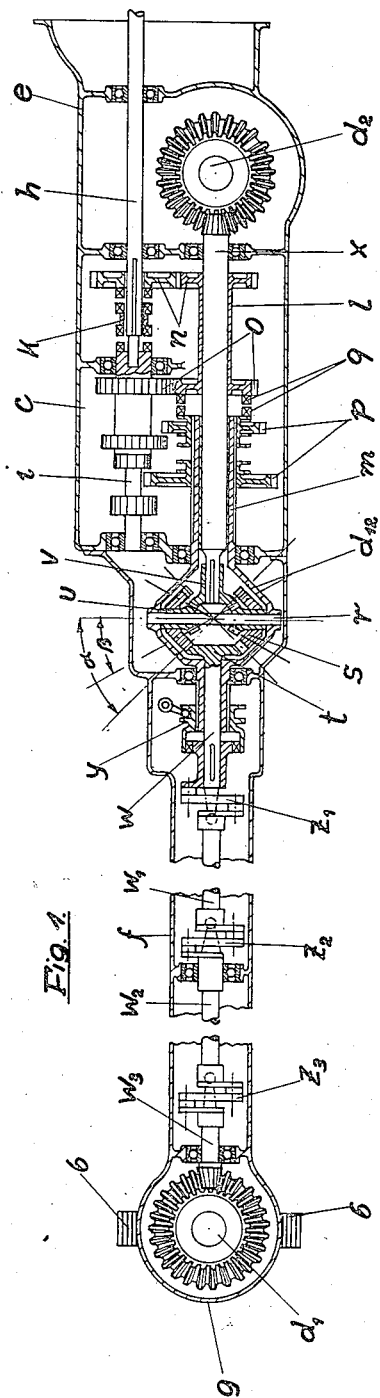
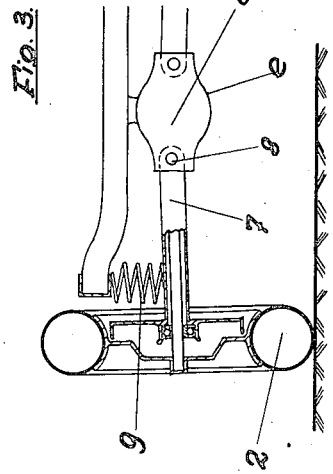
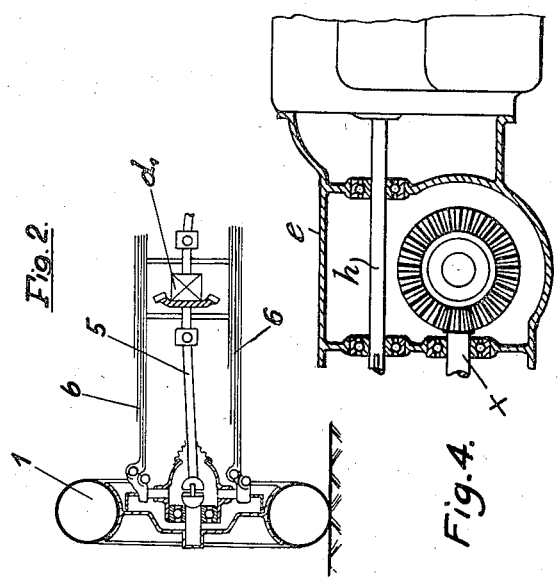
Inventor.
Max Wagner Patented Mar. 9, 1937

2,072,994

UNITED STATES PATENT OFFICE 2,072,994

MOTOR VEHICLE

Max Wagner, Stuttgart, Germany, assignor to Daimler Benz Aktiengesellschaft, Stuttgart-Unterturkheim, Germany Application March 13, 1935, Serial No. 10,947
In Germany March 15, 1934

3 Claims. (Cl. 180—22)

This invention relates to a driving means for motor vehicles, more particularly those with two or more driven axles and a differential arrangement for distributing the driving torque and consists in a particularly suitable arrangement of the drive including the motor and the change speed gear.

In the accompanying drawing—
Fig. 1 shows a four-wheel drive,
Fig. 2 the front axle and
Fig. 3 the rear axle thereof.
Fig. 4 shows on a reduced scale the motor attached to the right hand end of the casing of the drive shown in Fig. 1.

Figs. 1 to 3 show the constructional form of a four-wheel drive according to the invention. The motor is fixed by flanges (Fig. 4 to the right) to the casing $e$ which contains the change speed gear $c$ and the differential gear $d_2$ for the rear axle. This casing forms a part of the vehicle frame and is continued by the adjoining casing for the differential gear $d_{12}$ and the tube $f$ which connects the drive casing with the front axle casing $g$. The engine drives the central differential gear contained in the differential casing $d_{12}$ from which the drive is transmitted to the differential gears $d_1$ and $d_2$ of the front and rear axles, respectively. In detail the drive is effected by the engine shaft $h$ which extends over and beyond the rear axle and is adapted to be coupled with the main shaft $i$ of the gear through a change over coupling $k$. The two hollow shafts $l$ and $m$ act as countershafts for the change speed gear, the arrangement being such that the shaft $l$ can be coupled on the one hand through the permanently meshing pair of toothed wheels $n$ by way of the coupling $k$ with the shaft $h$ and on the other hand through the permanently meshing pair of toothed wheels $o$ with the main shaft $i$ of the gear. The countershaft $m$ is further capable of being coupled in the usual way through slidable wheels $p$ with the main shaft $i$ of the gear. Further coupling means $q$ are also provided between the shafts $l$ and $m$.

The countershaft $m$ is rigidly connected to the differential casing $d_{12}$. In this casing is mounted the transverse pin $r$, on which are rotatable the larger bevel wheels $s$ for driving the bevel wheel $t$ and the smaller bevel wheels $u$ for driving the bevel wheel $v$. The bevel wheels $s$ and $u$ are in each case rigidly connected together to form a pair. The bevel wheel $t$ serves for driving the shaft $w$ leading to the front axle and the bevel wheel $v$ for driving the shaft $x$ leading to the rear axle.

The teeth of the bevel wheels of the differential gear are so selected that the semi-vertical angle $\alpha$ of the bevel wheels $s$ and $t$ is greater than the semi-vertical angle $\beta$ of the bevel wheels $u$ and $v$.

The torque transmitted by the shaft $m$ to the differential gear $d_{12}$ thus distributes itself unequally to the shafts $w$ and $x$, that is to say the rear axle is driven by the shaft $x$ in accordance with its heavier loading, more particularly by the weight of the driving unit with a greater torque than the front axle by the shaft $w$.

At the left-hand end of the differential body $d_{12}$ a claw coupling $y$ (Fig. 1) is keyed on, which enables direct coupling of the differential body with the shaft $w$. This locks the differential gear and the shaft $m$, the differential casing $d_{12}$ and the shafts $w$ and $x$ are rigidly coupled with one another. In the example shown the shaft $w$ does not directly drive the front axle, but is connected by any suitable universal coupling $z_1$ with a shaft $w_1$ and the latter by a universal coupling $z_2$ with a shaft $w_2$ and the latter by a further universal coupling $z_3$ with the actual driving shaft $w_3$ of the front wheels. The shaft $w_3$ may drive in the usual way the differential gear $d_1$ which through articulated shafts 5 drives the steerable front wheel 1 which are guided independently of one another by two superposed transverse leaf springs 6.

The drive of the rear wheels is effected directly by the shaft $x$ which extends through the hollow shafts $m$ and $l$ of the gear. The differential gear $d_2$ is disposed below the engine or coupling shaft $h$. The rear wheels 2 are mounted on swinging half axles 7 which swing about lateral joints 8 of the casing $e$ and are sprung with respect to the frame, for instance by unguided helical springs 9.

Owing to the countershafts $l$ and $m$ being disposed as hollow shafts on the driving shaft $x$, special bearings for the countershaft in the casing become unnecessary. The arrangement both saves space and gives favourable weight conditions. The latter also applies more particularly to the arrangement of the engine and the gear on different sides of one driving axle, more particularly the rear axle. The parallel guiding of the front wheels has the advantage that the steering wheels are free from gyroscopic reactions, while the mounting of the rear wheels on swinging half axles gives the vehicle greater stability against lateral inclination, when negotiating a curve and against transverse oscillations.

The change speed gear is operated for instance in the following maner: The first and second speed is formed by the sliding wheels *p*, the change over coupling *k* being to the left and coupling the shafts *h* and *i* with one another. In the third speed the sliding wheels are disengaged and the coupling *q* engaged, the shafts *h* and *i* being still coupled together by the coupling *k*. The fourth speed is obtained through the coupling means *q*, which are locked for this purpose, by way of the pair of wheels *n*, by coupling the latter with the shaft *h* through the coupling *k* which for this speed is moved to the right. Through further combinations further speeds might be operated, for instance through the drive being derived from the shaft *h* through the toothed wheels *n* to the countershaft *l* and then by way of the wheels *o* back to the shaft *i* and by way of the sliding wheels *p* to the shaft *m*.

What I claim is:

1. In a motor vehicle a differential gear, a shaft which is driven by the differential gear and conveys the drive to the wheels, a hollow shaft which drives the differential gear and surrounds the first named shaft, a second hollow shaft which is capable of being coupled with the first named hollow shaft and also surrounds the first named shaft, a main line of gear shafting which is parallel to the aforesaid shafts, pairs of toothed wheels which are permanently in mesh with one another and which connect one of the hollow shafts with the main line of gear shafting and pairs of sliding wheels which connect the other hollow shaft with the main line of gear shifting.

2. In a motor vehicle the combination claimed in claim 1, in combination with a wheel axle which is driven by the first named shaft and is disposed transversely thereto and a motor disposed on the side of the wheel axle opposite the said toothed wheels, the motor shaft forming the extension of the main line of gear shifting and crossing the wheel axle above the latter.

3. In a motor vehicle a substantially tubular central longitudinal frame member which surrounds a differential gear disposed in the middle part thereof, two axle gears disposed substantially at the ends of the central longitudinal frame member, driving shafts extending from the middle differential gear, one of them to one axle gear and the other to the other axle gear and a change speed gear disposed between the middle differential gear and one of the two axle gears, a motor which is connected to that end of the tubular central longitudinal frame member, which lies on the change speed gear side of the middle differential gear.

MAX WAGNER.